United States Patent [19]
Ota et al.

[11] Patent Number: 4,564,497
[45] Date of Patent: Jan. 14, 1986

[54] METHOD OF PRODUCING BOTTLES OF SATURATED POLYESTER

[75] Inventors: Akiho Ota, Tokyo; Yukio Koshidaka, Tochigi, both of Japan

[73] Assignee: Yoshino Kogyosho Co., Ltd., Japan

[21] Appl. No.: 607,724

[22] Filed: May 7, 1984

Related U.S. Application Data

[63] Continuation of Ser. No. 402,653, Jul. 28, 1982, abandoned, which is a continuation of Ser. No. 68,242, Aug. 20, 1979, abandoned.

[51] Int. Cl.$^4$ .............................................. B29C 17/07
[52] U.S. Cl. ..................................... 264/521; 425/526
[58] Field of Search ............... 264/519, 520, 521, 522, 264/327; 425/526; 432/10

[56] References Cited
U.S. PATENT DOCUMENTS 2,560,855  7/1951  Flanagan ......................... 264/327 X
2,985,915  5/1961  Winstead ......................... 264/522 X
4,179,488 12/1979  Nishikawa et al. ................ 264/521

Primary Examiner—Jan Silbaugh
Attorney, Agent, or Firm—Parkhurst & Oliff

[57] ABSTRACT

A method of producing a saturated polyester resin bottle having a white-patterned wall by bringing at least one heat absorbing member into partial contact with a transparent tubular parison of a saturated polyester resin, when the tubular parison is heated, so that the portions of the saturated parison other than that contacting with the heat absorbing member may be heated to a relatively high temperature and may be locally crystallized to leave a desired white pattern. The bringing operation of the heat absorbing member is accomplished by inserting the heat absorbing member attached to a stem into the tubular parison thereby to prevent the portion of the tubular parison contacting with the heat absorbing member from turning locally white. The aforementioned relatively high temperature is higher than the glass transition temperature and lower than the crystallization temperature of the saturated polyester resin used. Moreover, the heating treatment is interrupted while the parison portion contacting with the heat absorbing member is left under its uncrystallized transparent condition.

5 Claims, 4 Drawing Figures

METHOD OF PRODUCING BOTTLES OF SATURATED POLYESTER

This is a continuation of application Ser. No. 402,653 filed July 28, 1982 now abandoned which in turn is a continuation of Ser. No. 068,242 filed Aug. 20, 1979 and now abandoned.

BACKGROUND OF THE INVENTION

1. Field of the Invention

The present invention relates to a method of producing a bottle of a saturated polyester resin, which is partially crystallized to have a white pattern.

2. Description of the Prior Art

For production of frosted bottles, there have conventionally been known various methods, e.g., a method, in which a mold having its cavity formed with a rough surface is used to form a fine roughness on the surface of a bottle product, or another method, in which the bottle surface is etched after the bottle is molded. All of the prior art methods have required very complex steps so that the resultant production costs have become accordingly high. Moreover, the bottles produced according to those methods have failed to have smooth surfaces with the results that they have been difficult to clean once soiled and that they have been liable to trap dust on their surfaces. Especially in case the bottles which have their surfaces partially frosted or patterned, additional step or steps have had to be included which increase the production costs to an undesirable extent.

On the other hand, a concept of heating a bottle of a saturated polyester resin so that it may be crystallized white as a whole has been proposed in the prior art. However, this concept has never anticipated the formation of a white pattern on the surface of the bottle.

SUMMARY OF THE INVENTION

It is therefore an object of the present invention to provide a method of producing a saturated polyester resin bottle having a white-patterned wall by bringing a heat absorbing member into partial contact with a transparent tubular parison of a saturated polyester resin, when the tubular parison is heated, so that the portions of the parison other than that contacting with the heat absorbing member may be heated to a relatively high temperature and may be locally crystallized to leave a white pattern.

Another object of the present invention is to provide a method of the above type, which is simplified by merely inserting the heat absorbing member, which is attached to a stem, into the tubular parison thereby to prevent the portion of the parison contacting with the member from turning locally white.

According to a major feature of the present invention, there is provided a method of producing a saturated polyester resin bottle having a white-patterned drum wall, which method comprises: a first step of injection-molding a transparent tubular parison of a saturated polyester resin, which has its one end bottomed and its other end opened; a second step of holding said tubular parison in an upright position, while fitting the open end of said tubular parison in a holding jig and inserting a pattern forming device having at least one head absorbing member into said tubular parison in a manner that said heat absorbing member is brought into contact with the inner drum wall of said tubular parison; a third step of heating said tubular parison from the outer drum wall thereof so that only those outer wall portions of said tubular parison, which are spaced to be free from the contact with said heat absorbing member, may be heated to a relatively high temperature and may be locally crystallized white; and a fourth step of blowing the crystallized tubular parison into the saturated polyester resin bottle of a desired shape having the white-patterned drum wall.

BRIEF DESCRIPTION OF THE DRAWING

Other objects and advantages of the present invention will become apparent from the following description taken in conjunction with the accompanying drawing, in which.

DESCRIPTION OF THE PREFERRED EMBODIMENTS

Figure 1:
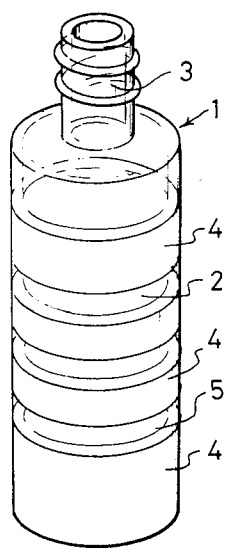
FIG. 1 is a perspective view showing a bottle which is produced by a method according to the present invention.
Figure 2:
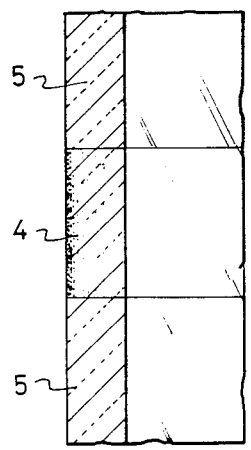
FIG. 2 is an enlarged cut-away sectional view showing a portion of the drum wall of the bottle of FIG. 1.

A method of producing a bottle having a white pattern according to the present invention will now be described with reference to the accompanying drawing. As shown in FIGS. 1 and 2, a saturated polyester resin bottle 1, which is produced by a method according to the present invention, is composed of a circumferential wall 2 forming the drum portion and a mouth 3 reduced to have a smaller diameter. The drum wall 2 is formed in a lateral stripe pattern with opaque or white portions 4 which are arranged at a suitable spacing to leave transparent portions 5 in between. It should be noted here that the white portions 4 need not always be formed into such lateral pattern but may be formed into any shape such as a vertical stripe pattern or a dotted pattern.

Figure 4:
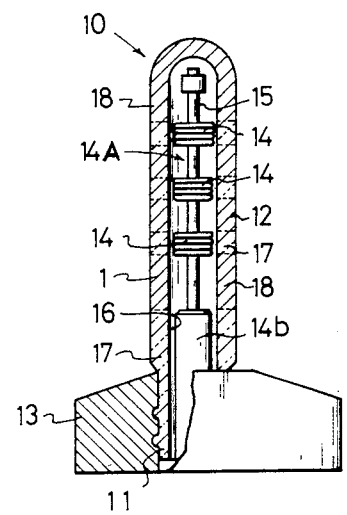
FIG. 4 is a sectional view illustrating the condition, under which a tubular parison of the bottle of FIG. 1 or 3 is held while it is being heated.

Turning to FIG. 4, the actual bottle producing procedures will be detailed in the following. As a first step, a transparent tubular parison 10 of a suitable saturated polyester resin is prepared by an injection-molding process. The tubular parison 10 is made to have its one end bottomed and its other end opened. Since the tubular parison 10 is made of a saturated polyester resin, it will turn milk-white as a whole, as is well known in the relevant art, it if is left to gradually cool down from its molding temperature after it has been molded. Therefore, it is necessary that the tubular parison be cooled so fast to a room temperature as not to invite such whitening phenomena. The open end or mouth forming portion 11 of the tubular parison 10 is made thinner than a drum wall 12. This is because the mouth forming portion 11 is turned into the mouth of the final bottle product without being subjected to an extending treatment while retaining its initial thickness. On the contrary, the drum wall 12 is made thicker because it is later subjected to a biaxial extending treatment.

As a second step, the transparent tubular parison 10 thus prepared is held in an upright position with its mouth forming portion 11 being fitted in a holding jig 13 so that the subseqent heat treatment may be stably performed. The holding jig 13 is equipped with a pattern forming device 14A such that the latter can be inserted into the tubular parison 10 under its held condition. The pattern forming device 14A has a stem 15 carrying at least one, or usually several heat absorbing members 14, each of which is composed of either a plurality of piled O-rings or a metal ring having a slightly smaller diameter than the internal diameter of the tubular parison 10. Moreover, the heat absorbing members 14 are inserted and removed by operating a body 14b, from which the stem 14 coaxially extends. If, as an alternative, the heat absorbing members 10 are not fixed on the stem 15 but can be shifted to desired positions, the white pattern on the final bottle product, as will be described later, can be changed freely. In either way, the tubular parison 10 can be molded into a bottle having a white-patterned drum wall by inserting the pattern forming device 14A into the tubular parison 10 and by leaving the same in a fixed position.

As a third step, the tubular parison 10 is heated from its outer wall by means of a suitable heater to a temperature which is higher than the glass transition temperature ($T_g$) and lower than the crystallization temperature ($T_{cc}$) of the saturated polyester resin employed. Then, crystallization is permitted to develop the whitening phenomena in accordance with the correlation between the temperature and the time. With this in mind, the heating treatment is continued until the outer drum wall of the tubular parison 10 is whitened to some extent. Here, the temperature rise in those outer wall portions, which are in contact with the heat absorbing members 14, is retarded due to the heat absorption by the members 14. As a result, the whitening phenomena is initiated at those outer wall portions 18, which are spaced to be free—on the contact with the heat absorbing members 14. The heating treatment thus far described is interrupted when the outer wall portions 18 are whitened to some extent while leaving the outer wall portions 17 under their unwhitened transparent condition. In the tubular parison 10, incidentally, the outer wall portions 18 kept out of contact with the heat absorbing members 14 are whitened such that their crystallization is decreased inwardly, i.e., toward their inner sides 16, thus leaving the inner sides 16 uncrystallized. At the subsequent blowing step, therefore, there occurs no disadvantage of differences between the whitened portions and the unwhitened portions of the resulting bottle.

As a fourth step, the tubular parison 10 having been subjected to the heat treatment is inserted into a mold and fixed in position. Then, the tubular parison 10 is blown into the saturated polyester resin bottle of a desired shape having the white-patterned drum wall.

Figure 3:
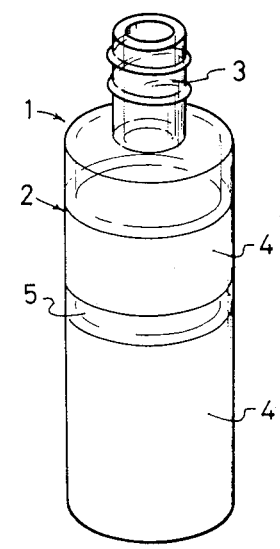
FIG. 3 is similar to FIG. 1 but shows another bottle which is produced by a method according to another embodiment of the present invention.

As a result, the portions 17 appearing in FIG. 4 are turned into the transparent portions 5 appearing in FIG. 1, whereas the other portions 18 are turned into the opaque portions 4. In the pattern forming device 14A, incidentally, in case the heat absorbing member 14 is made movable relative to the stem 15, it is possible to produce a bottle having the pattern shown in FIG. 3.

As has been described hereinbefore, according to the present invention, the white pattern can be formed with less difficulty as a result of the crystallizing phenomena than the conventional method, in which the white pattern is formed by forming fine roughnesses on the surface of the bottle product. Since, moreover, the drum wall of the tubular parison is locally blocked from temperature rise and accordingly from becoming white merely by inserting heat absorbing members into the tubular parison, these members never offer an obstacle to the heating treatment of the tubular parison. As a result, the productivity of the bottles formed with the crystallized white patterns can be remarkably improved. Moreover, the patterned bottles thus produced are so beautiful that they can provide reservoirs especially suitable for high grade cosmetics.

What is claimed is:

1. A method of producing a polyester resin bottle, having whitened and transparent regions, from a transparent parison comprising:
    forming a substantially cylindrical transparent polyester resin parison; inserting into said parison a pattern forming device having at least one heat absorbing element positioned thereon so that at least one heat absorbing element contacts the interior wall of said parison and no other portion of said pattern forming device other than at least one heat absorbing element contacts said parison;
    applying heat to an outer surface of said parison and simultaneously absorbing heat from a portion of an inner surface of said parison by means of said pattern forming device, said element contacting said portion of said inner surface of said parison thereby preventing whitening of a portion of said outer surface opposite said heat absorbing element, while those portions of said outer surface not opposite said heat absorbing element are whitened and the entire inner surface of said pairson remains unwhitened; and blow-molding said parison into a resin bottle.

2. A method in accordance with claim 1, wherein said whitened areas are heated to a temperature higher than the glass transition temperature and lower than the crystallization temperature of the resin.

3. A method in accordance with claim 1, wherein said pattern forming device is comprised of a central cylindrical member with rings positioned thereabout at intervals to form said at least one heat absorbing element.

4. A method in accordance with claim 3, wherein said at least one heat absorbing element is comprised of O-rings.

5. A method in accordance with claim 3, wherein said at least one heat absorbing element is comprised of a metal ring.

* * * * *